June 10, 1969   S. KURLANDSKY   3,448,953
CHAIN FOR SUPPORTING FLEXIBLE CONDUIT
Filed Aug. 30, 1967

INVENTOR
Sam Kurlandsky
BY Hueschen & Kurlandsky
ATTORNEYS

June 10, 1969  S. KURLANDSKY  3,448,953
CHAIN FOR SUPPORTING FLEXIBLE CONDUIT
Filed Aug. 30, 1967
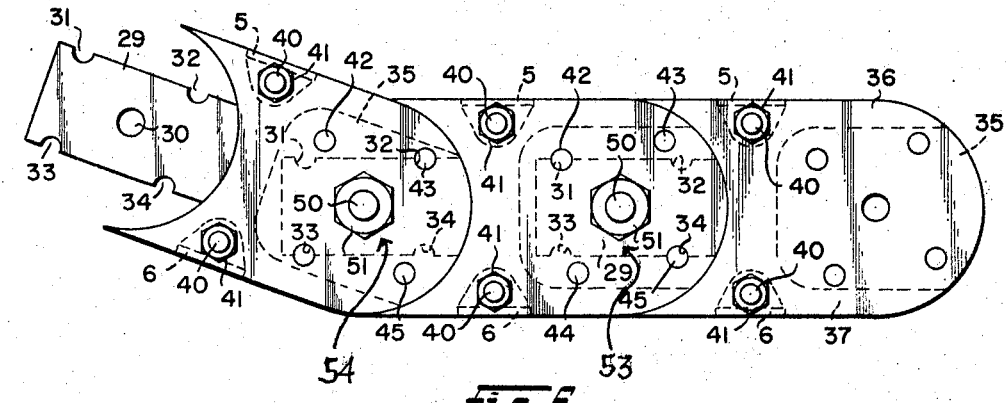
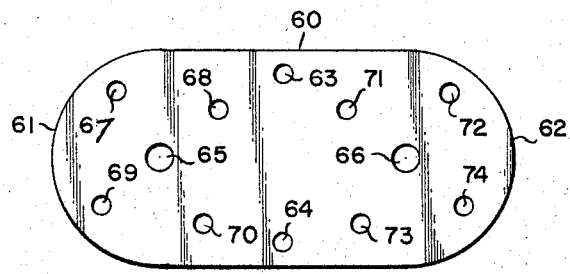
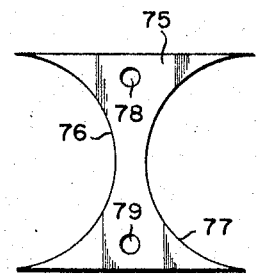
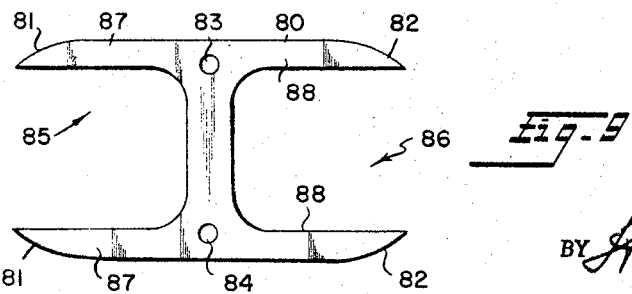
INVENTOR
Sam Kurlandsky
ATTORNEYS June 10, 1969  S. KURLANDSKY  3,448,953
CHAIN FOR SUPPORTING FLEXIBLE CONDUIT
Filed Aug. 30, 1967  Sheet 3 of 3
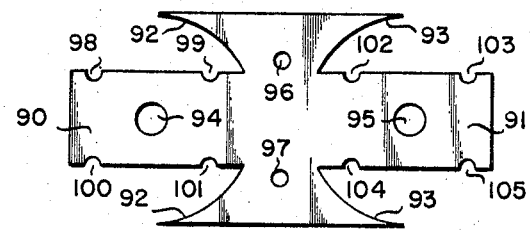
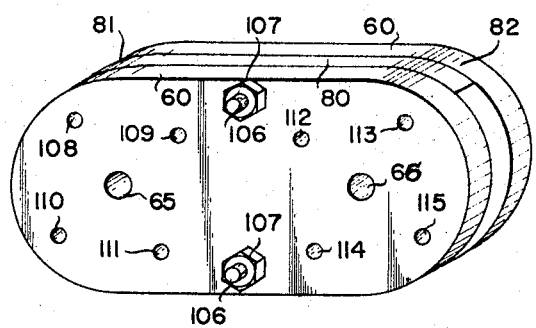
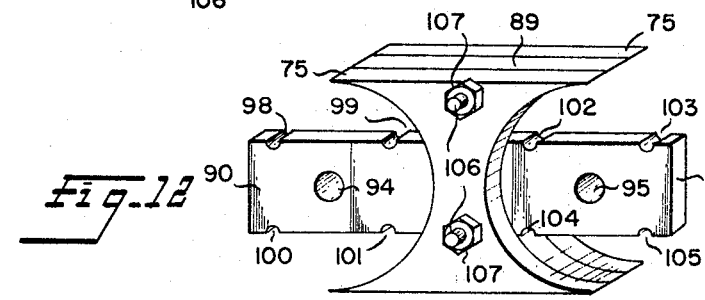
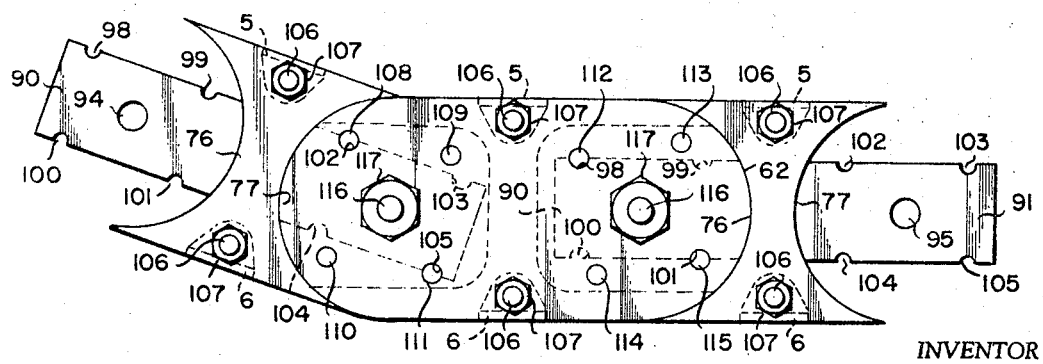
INVENTOR
Sam Kurlandsky
BY Hueschen & Kurlandsky
ATTORNEYS United States Patent Office 3,448,953
Patented June 10, 1969

3,448,953
CHAIN FOR SUPPORTING FLEXIBLE CONDUIT
Sam Kurlandsky, Kalamazoo, Mich., assignor to Aero-Motive Mfg. Co., Kalamazoo, Mich., a corporation of Michigan
Filed Aug. 30, 1967, Ser. No. 664,510
Int. Cl. F16l *3/14;* F16g *13/07*
U.S. Cl. 248—51                                    15 Claims

ABSTRACT OF THE DISCLOSURE

Chain for supporting flexible conduit formed of links, pivotally interconnected at their ends, and having a tongue extending from each link and pivotally connected to an adjacent link, and four pins mounted in each link adapted to engage the pivotal tongue of an adjacent link and to provide two limiting positions of pivotal movement between each pair of links and to provide separate points of support at each limiting position.

Background of the invention

The present invention relates to chains and is more particularly concerned with a chain designed to support flexible conduits such as electrical cables and fluid conducting hoses which transport electricity and/or fluids to a movable station.

Apparatus has been disclosed in the prior art adapted to support conduits for electrical current, or liquid or gaseous media to stations which are adapted to move, particularly in a straight line, as for example large machine tools and cranes. Such apparatus utilizes one or more chains comprised of a plurality of interconnected links and having supporting means for the conduit.

Pivotal movement between the links is limited in one direction to a point where the links lie in a straight line and in the other position at an acute angle. Consequently, when in one position the chain is self-supporting in a straight line. Moreover, when turned in the other direction, the chain is self-supporting at a curvature having a predetermined radius. The chain is normally mounted with one end attached to a fixed station and the other attached to a station movable along a straight line path. The chain is normally arranged to extend as a horizontal U between the fixed station and the movable station, and in some embodiments is completely self-supporting. In other embodiments a supporting track or bed may be utilized. In most applications two parallel chains held in spaced apart relationship by conduit-supporting members are used.

Prior art chains as described above, although they are generally satisfactory in carrying out their function of supporting cables and conduits, are subject to the disadvantage that in each limiting position a substantial shear force is exerted on the pivot pin at each joint, thereby causing it to wear rapidly and to cause the apparatus to fail. This is particularly true when an operator stands upon the horziontal self-supporting portion of the chain, even though infrequently, during operation or maintenance. An additional disadvantage of some prior art chain supports is that the chains are complicated and expensive to produce.

Summary of the invention

It is an object of the invention to provide a chain support for flexible conduit which is self-supporting and is not necessarily supported by means of tracks. It is an additional object to provide a chain support of the type described which is relatively simple and inexpensive to build. It is a further object to provide a supporting chain wherein each pair of links is pivotal between two limiting positions, and wherein the shear force on the pivot is substantially reduced or even completely eliminated. It is a further object to provide a chain support wherein the chain links are fully covered, thereby protecting the operator and preventing foreign particles from entering and causing the chain to fail. The accomplishment of the foregoing and additional objects will become more fully apparent hereinafter.

According to the invention, a chain support for flexible conduit is provided comprised of a plurality of interconnected links, each adjacent pair of links being adapted to pivot at their ends between two limiting positions. In a preferred embodiment, the limits are so designed that the chain is horizontal in one limiting position and curved about a predetermined radius of curvature at the other limit. Each link is provided with a tongue positioned in a cavity provided in the adjacent link and pivotally affixed to the adjacent link by a pivot pin mounted therein and extending through a pivot hole in an intermediate portion of the tongue. Four limit pins are mounted in the adjacent link and so arranged that in each limiting position the tongue engages two limit pins, one on each side of the pivot pin. As a result, at each limiting position the pivot tongue is provided with two points of support one on each side of the pin, thereby preventing any substantial shear force from being applied to the pivot pin, and greatly extending its useful life.

Brief description of the invention

The invention in its preferred embodiments is illustrated by the accompanying drawings in which:

FIG. 6 is an elevational view of a segment of a chain support formed of links according to FIG. 5.

FIG. 7 is a plan view of an outer plate used for forming one link of another embodiment of the invention.

FIG. 8 is a plan view of a plate used in forming a complementary plate.

FIG. 9 is a plan view of an inner plate used in conjunction with the plate of FIG. 7.

FIG. 10 is a plan view of an inner plate used in conjunction with the plate of FIG. 8.

FIG. 11 is a perspective view of a link formed from the plates of FIGS. 7 and 9.

FIG. 12 is a perspective view of a complementary link formed of the plates of FIGS. 8 and 10; and FIG. 13 is an elevational view of a chain support segment formed of the links of FIGS. 11 and 12.

Description of the preferred embodiments

Reference is now made to the accompanying drawings for a better understanding of the invention, wherein all the parts are numbered and wherein the same numbers are used to refer to the same parts throughout.

Figure 1:
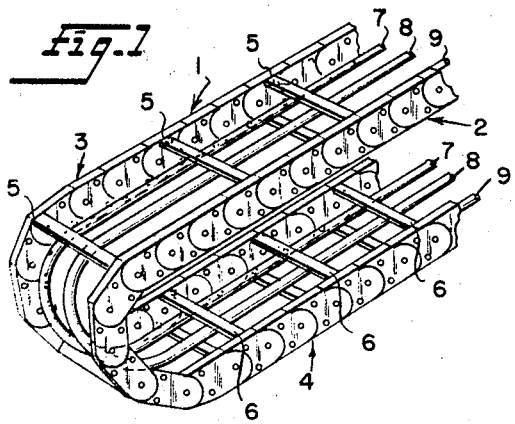
FIG. 1 is a perspective view of a chain support assembly and supported conduit.
Figure 2:
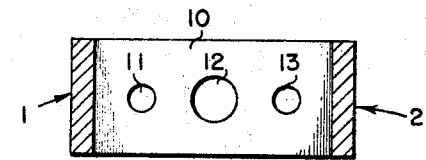
FIG. 2 is a cross-sectional view through a chain support assembly having a somewhat modified transverse supporting member.

Referring to FIG. 1, a chain support according to the invention is shown together with supported conduits, and comprises lateral chains 1 and 2 each comprised of a plurality of pivotally interconnected links 3 and 4 respectively. The lateral chains 1 and 2 are connected together at intervals by transverse supporting members 5 and 6. A plurality of conduits 7, 8 and 9 are supported between the supporting members 5 and 6. Alternatively, as shown in FIG. 2, a single supporting member 10 may be utilized having openings 11, 12, and 13 provided therein, through which the conduits extend. The supporting members, whether those of FIG. 1 shown by the numerals 5 or 6 or those of FIG. 2, may be either affixed at each link of the chain or may be spaced one or more links apart.

Figure 3:
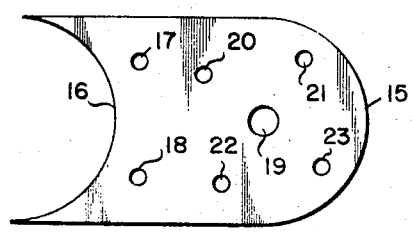
FIG. 3 is a plan view of an outer plate which may be used for assembling a chain link according to the invention.
Figure 4:
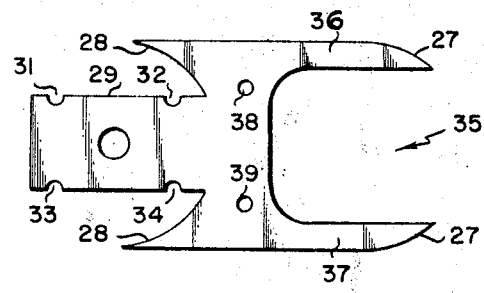
FIG. 4 is a plan view of a complementary inner plate.

FIGS. 3 and 4 illustrate basic plates which may be utilized to form links constituting several embodiments of the present invention. FIG. 3 illustrates an outer plate having a sheet-form body 14, a convexly arcuate end 15, a concavely arcuate end 16, and mounting holes 17 and 18. A pivot pin hole 19 is placed at the center of a circle a portion of which is defined by the convex end 15. The plate additionally is provided with four limit pin holes 20, 21, 22 and 23.

The inner plate, shown in FIG. 4, comprises a sheet-form body 26, similar in general contour to that of FIG. 3. The plate also has a forked end 27 which is convexly arcuate in part and partially concavely arcuate portions 28. A pivotal tongue 29 extends from the concavely arcuate portion and is provided at its mid-section with a pivot pin hole 30 and limit pin engaging recesses 31, 32, 33 and 34. At the convex end 27 the plate is cut away to provide a pivotal tongue receiving recess 35 and marginal guards 36 and 37. The plate is additionally provided with mounting holes 38 and 39.

Figure 5:
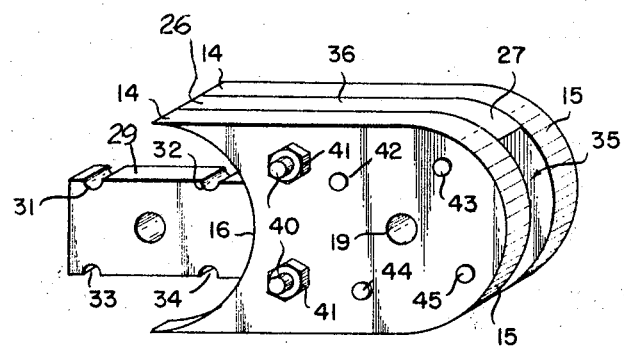
FIG. 5 is a perspective view of a chain link according to the invention.

FIG. 5 illustrates a chain link formed by bolting together two outer links such as shown in FIG. 3, with an inner link, shown in FIG. 4, disposed therebetween, by means of bolts 40 and nuts 41. Additionally, limit pins 42, 43, 44 and 45, in the form of rivets or bolts and nuts, are inserted in the limit pin holes 20, 21, 22 and 23.

In the preferred embodiment of the link of the present invention, the arcuately convex ends 15 and 27 are contiguous with the surface of an imaginary cylinder having its axis passing through the center of the pivot pin hole 19. Furthermore, the concavely arcuate ends 16 and 28 are substantially contiguous with the surface of a common imaginary cylinder having its axis passing through the center of the pivot pin hole 30. Additionally, the radii of curvature of the two imaginary cylinders are equal. As a result, the convex ends of each link are completely covered by the concave ends of the adjacent links in which they nest in all pivotal positions, thereby preventing the possibility of injury to the operator and preventing foreign particles from entering into the pivotal mechanism of each link.

FIG. 6 illustrates a segment of chain support formed by interconnecting links according to FIG. 5 by means of a pivot pin 50 in the form of a bolt maintained in place by means of a nut 51. The links are connected by inserting the tongue 29 into the recess 35. A pivot pin 50 shown in the form of a bolt, is inserted through the pivot holes 19 and 30 and affixed by means of the nut 51. Additionally, transverse supporting members 5 and 6, as shown in FIG. 1, are affixed to the chain by means of the bolt 40 and nuts 41. The supporting members 5 and 6 are affixed at their other ends to a similar chain, not shown.

The mode of operation of the chain of the invention can be seen in FIG. 6. In the drawing the pivotal joint 53 is at the limiting position in which the links are aligned in a straight line. As can be seen, in this position the recess 31 engages the limit pin 42 and the recess 34 engages the limit pin 45. Thus two points of support are provided, one on each side of the pivot pin 50. Consequently no shear force is exerted on the pin. At the pivotal joint 54 the two links are in a position at an angle of less than 180° with respect to each other. In this position the recess 33 engages the limit pin 44 and the recess 32 engages the limit pin 43, again providing two points of support one on each side of the pivot pin 50, and functioning to remove shear force from the pin.

Although it is not necessary to utilize the recesses 31, 32, 33 and 34, and an arrangement can readily be provided in which the straight sides of the tongue 29 engage the limit pins 42, 43, 44 and 45, the recesses serve a useful function in that they lock the links in position at the pivotal limits with regard to longitudinal movement, thereby preventing the exertion of shear force against the pivot pin 50 as a result of longitudinal tension, as well as pivotal motion.

FIGS. 7–13 illustrate another embodiment of the invention.

FIG. 7 illustrates an outer plate 60 having two convex ends 61 and 62, mounting holes 63 and 64, and limit pin holes 67, 68, 69, 70, 71, 72, 73 and 74.

FIG. 8 illustrates a complementary outer plate 75 having two concave ends 76 and 77 having the same curvature as the convex ends 61 and 62. The plate additionally has mounting holes 78 and 79.

FIG. 9 illustrates an inner plate 80 which is used in combination with the plate of FIG. 7 and has partial concave ends 81 and 82 of the same curvature as the convex ends of the plate 60. Additionally the plate 80 has mounting holes 83 and 84 and is provided with cut-outs 85 and 86 defining marginal guards 87 and 88.

FIG. 10 illustrates an inner plate 89 designed to be used in combination with the outer plate 75 and comprises pivotal tongues and partial concavely arcuate ends having the same curvature as the concave ends 76 and 77. Additionally, the plate has pivot pin holes 94 and 95, mounting holes 96 and 97, and pivot pin engaging recesses 98, 99, 100, 101, 102, 103, 104, and 105.

FIG. 11 illustrates one of the links used in forming the chain of the present invention and is formed by affixing together two outer plates 60 having an intermediate plate 80 therebetween by means of bolts 106 and nuts 107, and inserting limit pins 108, 109, 110, 111, 112, 113, 114, and 115. The limit pins may be in the form of rivets of bolts and nuts, or other suitable similar structures.

FIG. 12 illustrates a complementary link prepared by bolting together two outer plates 75 and an inner plate 89.

FIG. 13 illustrates a chain support segment prepared by bolting together alternately links according to FIG. 11 and FIG. 12 by means of pivot pins 116 in the form of bolts 116 maintained in place by means of nuts 117, or alternatively, other suitable structures such as retaining washers. Additionally shown are transverse supporting members 5 and 6 affixed at their ends to the chain shown, and at their other ends to a similar chain, not shown.

The operation of the chain of the present invention can be understood by referring to FIG. 13. Considering the pivotal joint in which the adjacent links are aligned in a straight line, the recess 98 engages the limit pin 112 while the recess 101 engages the limit pin 115. Consequently, a point of support is provided on each side of the pivot pin 116 and substantially removes all shear force from the pivot pin. Moreover, the engagement between the recesses and the limit pins prevents even longitudinal force such as would be caused by pulling on the chain from being exerted on the pivot pin. Referring to the joint at which the adjacent links are disposed at an angle less than 180° with respect to each other, the recess 102 engages the pin 108 while the recess 105 engages the pin 111. Thus, here too a point of support is provided on each side of the pivot pin, thereby prolonging the useful life of the pivot pin.

A further advantage of the present invention can be seen in FIG. 13. At one joint, the convex end 81 is completely covered by the concave end 77. At the other end, the convex end 62 is completely covered by the concave end 76. As a result, the chain is completely shielded at its moving surfaces, thereby preventing injury to the operator and preventing the entrance of foreign particles into the moving mechanism of the chain.

The supporting chain structure of the present invention has a number of advantages over prior art structures.

First, in addition to providing all the necessary functions of conduit support for the particular application, that is, providing two limits of pivotal movement between the two links so that the chain is self-supporting when extended horizontally at one limit, and self-supporting about a defined radius of curvature at the other limit, the present structure provides two points of support at opposite sides of the pivot point for each limiting position, thereby greatly reducing the shear force against the pivot pin where such a pin is used and preventing rapid wear of the pivot pin and associated bearing structures. Moreover, the limiting surface structure may be so designed that all shear force is removed from the pivot structure at the limiting positions. The present structure has the further advantage that, because the links have mating convex and concave ends, the moving edges of the chain are completely shielded, and the possibility of injuries to the person of the operator removed. Moreover, because the chain is completely enclosed, it is virtually impossible for foreign particles such as metal turnings to become ensnared in the chain and thereby enter inside the chain and cause failure of operation. As a further advantage, the chain is made of simply cut and drilled flat plates which may be readily assembled and readily dismantled for repair or link replacement.

Although the structure of the present invention has been shown and described in relation to the use of metal plates, plastic plates may be substituted for many applications. Moreover, instead of using flat plates, unitary plastic or molded metal links may be utilized instead of links prepared by bolting together two or more plates.

Although in the embodiments described and shown in the drawings each link is comprised of only two or three plates, it is of course to be understood that 4, 5, 6, or even more plates may be utilized for certain purposes and are to be considered as falling within the invention disclosed and claimed. For example, additional plates may be utilized to give greater strength to each link. Additional plates having limit means may be utilized to provide greater strength at the limiting positions. Alternatively, very thin plates may be utilized at the outside of the link to serve as a cover or shield for the slots, notches, etc., which comprise the limit means. Additionally, instead of complete plates, partial plates may be utilized to cover the slots, notches, etc., which remain exposed, as for example, when only two plates are utilized in a link.

It is to be understood that the invention is not limited to the exact details of construction, operation or exact materials or embodiments shown and described, as obvious modifications and equivalents will be apparent to one skilled in the art.

I claim:

1. A support for a flexible conduit, said conduit being adapted to be operated with one end connected to a fixed station and the other end connected to a movable station, said support comprising at least one chain having conduit supporting means affixed thereto, said chain comprising a plurality of links interconnected at pivotal joints, at each pivotal joint a first one of said links having a pivotal tongue extending therefrom and a second link being provided with a recess having said pivotal tongue disposed therein, pivotal means pivotally connecting an intermediate portion of said pivotal tongue to said second link, and means defining two limiting positions of pivotal movement between said links comprising four limit pins mounted in said second link and disposed two on each side of said tongue, and being disposed two on each side of said tongue in such manner that at each limiting position said tongue engages two limit pins one on each side of said pivotal means, thereby removing shear force from said pivotal means.

2. A support for a flexible conduit, said conduit being adapted to be operated with one end connected to a fixed station and the other end connected to a movable station, said support comprising a pair of chains having conduit supporting means intermediate and affixed to said chains and maintaining said chains in parallel spaced-apart relationship, each of said chains comprising a plurality of links interconnected at pivotal joints, at each pivotal joint a first one of said links having a pivotal tongue extending therefrom and a second link being provided with a recess having said pivotal tongue disposed therein, pivotal means defining a pivotal point and pivotally connecting an intermediate portion of said pivotal tongue to said second link, and means defining two limiting positions of pivotal movement between said links comprising four limit pins mounted in said second link and being so positioned two on each side of said tongue that, at each limiting position, said tongue engages two limit pins one on each side of said pivotal means, thereby removing shear force from said pivotal means.

3. A support according to claim 2, wherein said conduit supporting means comprises a plurality of transverse supporting members each affixed at one end to a link of one of said chains and at the other end to a link of the other of said chains, and wherein each supporting member is provided with an aperture adapted to have said conduit disposed therethrough.

4. A support according to claim 2, wherein each of said conduit supporting means comprises a pair of transverse supporting members each connected at one end to a link of one of said chains and at the other end to a link of the other of said chains, one of said supporting members being positioned at one edge of said chain and the other being positioned at the other edge of said chain, said conduit being adapted to be disposed intermediate said supporting members.

5. A supporting acocrding to claim 2, wherein each link is comprised of three plates affixed together and being arcuately convex at one end and arcuately concave at the other end, said intermediate plate having said pivotal tongue as an extension thereof from said concave end and being provided with a recess having the pivotal tongue of an adjacent link disposed therein, at each pivotal joint the convex end of one link and the concave end of the adjacent link being substantially contiguous with the surface of a common imaginary cylinder having its axis passing through said pivotal point.

6. A support according to claim 5, wherein said pivotal means comprises a pivot pin hole provided in each of the outer plates and in an intermediate portion of said pivotal tongue, and a pivot pin journaled in said pivot pin holes.

7. A support according to claim 2, wherein said chain is comprised of a plurality of pairs of links, one link in each pair having two concavely arcuate ends and a pivotal tongue extending from each end, and the other link being comprised of three plates and having two convexly arcuate ends, the intermediate of said plates being recessed at each end of said link and having a pivotal tongue from an adjacent link disposed in each of said recesses at each pivotal joint, the convex end of one link and the concave end of the adjacent link being substantially contiguous with the surface of a common imaginary cylinder having its axis passing through said pivotal point.

8. A support according to claim 7, wherein said pivotal means comprises a pivot pin hole provided in each of the outer plates and in an intermediate portion of said pivotal tongue, and a pivot pin journaled in said pivot pin holes.

9. A support according to claim 7, wherein said link having two pivotal tongues is also comprised of three plates.

10. A chain comprising a plurality of links interconnected at pivotal joints, at each pivotal joint a first one of said links having a pivotal tongue extending therefrom and a second link being provided with a recess having said pivotal tongue disposed therein, pivotal means pivotally connecting an intermediate portion of said pivotal tongue to said second link, and means defining two limiting positions of pivotal movement between said links comprising four limit pins mounted in said second link and disposed two on each side of said tongue, and being disposed two on each side of said tongue in such manner that at each limiting position said tongue engages two limit pins one on each side of said pivotal means, thereby removing shear force from said pivotal means.

11. A chain according to claim 10, wherein each link is comprised of three plates affixed together and being arcuately convex at one end and arcuately concave at the other end, said intermediate plate having said pivotal tongue as an extension thereof from said concave end and being provided with a recess having the pivotal tongue of an adjacent link disposed therein, at each pivotal joint the convex end of one link and the concave end of the adjacent link being substantially contiguous with the surface of a common imaginary cylinder having its axis passing through said pivotal point.

12. A chain according to claim 11, wherein said pivotal means comprises a pivotal hole provided in each of the outer plates and in an intermediate portion of said pivotal tongue, and a pivot pin journaled in said pivot pin holes.

13. A chain according to claim 10, wherein said chain is comprised of a plurality of pairs of links, one link in each pair having two concavely arcuate ends and a pivotal tongue extending from each end, and the other link being comprised of three plates and having two convexly arcuate ends, the intermediate of said plates being recessed at each end of said link and having a pivotal tongue from an adjacent link disposed in each of said recesses at each pivotal joint, the convex end of one link and the concave end of the adjacent link being substantially contiguous with the surface of a common imaginary cylinder having its axis passing through said pivotal point.

14. A chain according to claim 13, wherein said pivotal means comprises a pivotal hole provided in each of the outer plates and in an intermediate portion of said pivotal tongue, and a pivot pin journaled in said pivot pin holes.

15. A support according to claim 13, wherein said link having two pivotal tongues is also comprised of three plates.

References Cited

UNITED STATES PATENTS

| | | | |
|---|---|---|---|
| 1,952,885 | 3/1934 | Oakes | 74—250 |
| 3,103,126 | 9/1963 | Textrom | 74—250 X |
| 3,330,105 | 7/1967 | Weber | 248—49 X |

FOREIGN PATENTS

| | | |
|---|---|---|
| 1,460,204 | 12/1968 | France. |

CHANCELLOR E. HARRIS, Primary Examiner.

U.S. Cl. X.R.

59—78.1; 74—250